(No Model.)
J. J. JOHNSTON.
CAN SOLDERING APPARATUS.
No. 345,638. Patented July 13, 1886.
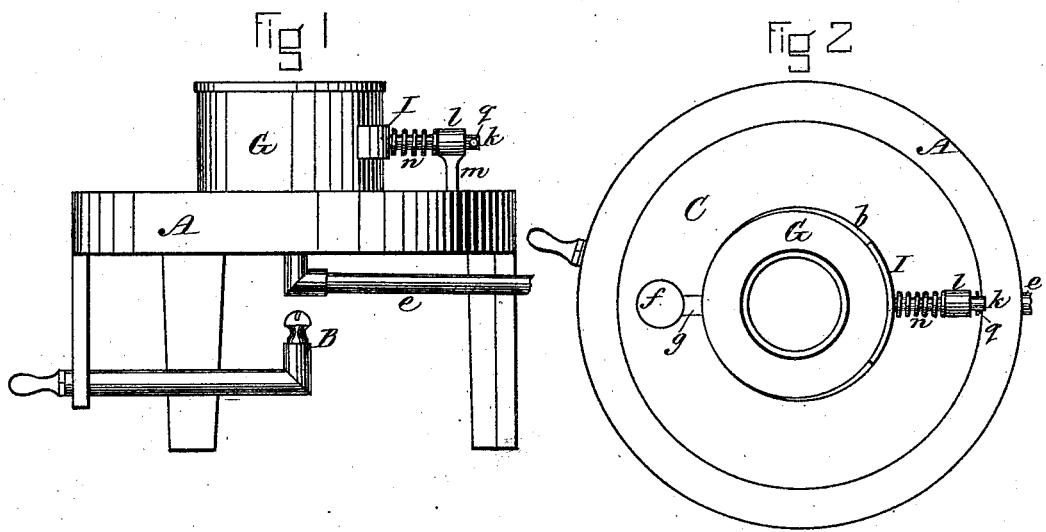
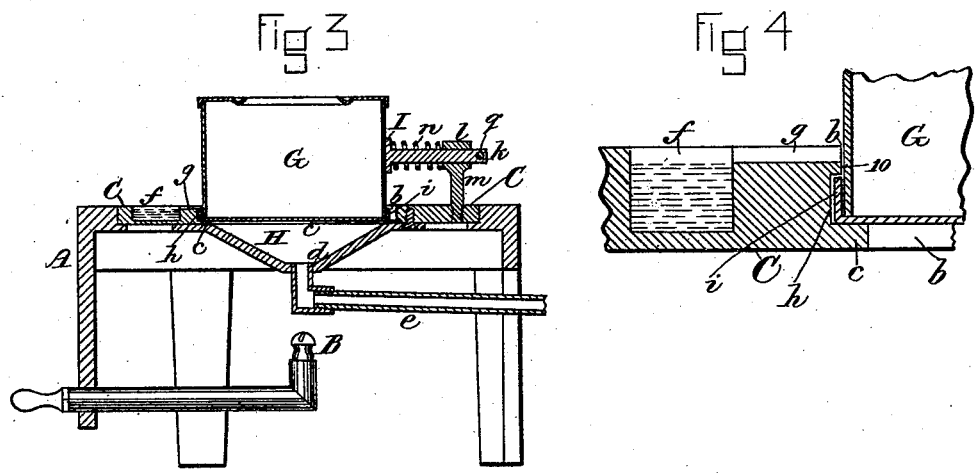
WITNESSES
W. J. Cambridge
Albert Mason
INVENTOR
John J. Johnston
By T. E. Teschemacher
Atty

UNITED STATES PATENT OFFICE.

JOHN J. JOHNSTON, OF BOSTON, MASSACHUSETTS.

CAN-SOLDERING APPARATUS.

SPECIFICATION forming part of Letters Patent No. 345,638, dated July 13, 1886.

Application filed May 14, 1886. Serial No. 202,211. (No model.)

*To all whom it may concern:*

Be it known that I, JOHN J. JOHNSTON, a citizen of the United States, residing at Boston, in the county of Suffolk and State of Massachusetts, have invented certain Improvements in Can-Soldering Apparatus, of which the following is a full, clear, and exact description, reference being had to the accompanying drawings, making part of this specification, in which—

Figure 1 is a side elevation of a can-soldering apparatus constructed in accordance with my invention, the can to be soldered being in place thereon. Fig. 2 is a plan of the same. Fig. 3 is a vertical section through the center of the same. Fig. 4 is a sectional detail enlarged.

My invention has for its object to simplify the construction of can-soldering apparatus, and avoid the waste of solder; and to this end my invention consists in certain novel combinations of parts and details of construction, as hereinafter set forth, whereby a more effective and desirable apparatus of this character is produced than is now in ordinary use.

In the said drawings, A represents the base or frame of the apparatus, within which is placed a gas-burner, B, or a lamp or other suitable means for heating the soldering-plate C, which is supported in the top of the frame A, and is preferably made removable therefrom.

At the center of the plate C is an aperture, b, for the reception of the can, G, to be soldered, a flange, c, being provided at the lower edge of this aperture, upon which the can rests while being rotated by hand or otherwise, as seen in Fig. 3, and by means of which it is supported at the exact height required to receive the solder, as hereinafter described.

Immediately beneath the aperture b, and secured to the under side of the plate C, is a shallow receptacle or chamber, H, for the reception of any solder which may flow down between the sides or walls of the aperture b and the bottom of the can, G, being soldered, and at the center or lowest portion of the receptacle H is an opening, d, having connected therewith a pipe, e, for conducting the surplus solder to a suitable receptacle, (not shown,) in which the solder is collected and saved, thus avoiding waste. The under side of the receptacle H, by reason of its form, serves as a deflector to direct the flame from the burner or lamp onto the plate C, and thus cause the same to be rapidly heated, as desired.

The plate C is provided on its upper side with a small recess or chamber, f, which forms a reservoir for containing the molten solder, which is maintained in a fluid state by the heat of the plate C. A feeding channel or groove, g, leads from the chamber f to the edge of the opening b, through which the molten solder flows into contact with the edge of the can G, and thus, as the latter is rotated on the supporting-flange c, the solder is applied to and fills the seam entirely around the edge of the can, as desired. The molten solder, which normally fills the chamber f to the level of the bottom of the feeding-channel g, is caused to flow through the said feeding-channel by dropping into the chamber f a small piece or lump of solder of the required size to produce an overflow of the exact amount of solder necessary to solder the can, and, if desired, a flange or guard may be placed around the edge of chamber f, to prevent any accidental flowing of the solder onto the surrounding surface of the plate C. The sides of the aperture b are preferably coated with tin or solder, which facilitates the operation of soldering, as it produces a more perfect adherence of the solder to the edge of the can as the latter is rotated within the said aperture. The vertical wall 10 of the aperture b is provided with a groove, h, which may extend entirely around said aperture, or be only on that portion in proximity with the solder-reservoir f. This groove h is for the reception of the upturned flange i, which forms the seam at the edge of the can, and allows the body or vertical sides of the can to lie close to the upper edge of the wall 10, as seen in Figs. 3 and 4, whereby the solder is caused to properly enter the seam, and the liability of its passing down between the bottom of the can and the lower edge of the aperture b diminished. As the diameter of the aperture b is necessarily somewhat greater than that of the can G, to allow the latter to be easily inserted and removed, I have found it desirable to employ a presser device for automatically pressing the can, as it is being rotated, firmly over against the side of the aperture b at which the solder-reservoir f is located. The device which I prefer to employ consists of a presser bar or plate, I, which is curved to fit the side of the can, and is located on that side of the aperture $b$ of the plate C directly opposite to the solder-reservoir $f$. This plate I is mounted on a short horizontal bar, $k$, which slides through a bearing, $l$, in a post, $m$, rising from the plate C, and is encircled by a spiral spring, $n$, which keeps the plate I in contact with the can, and the latter constantly in contact with the opposite side of the aperture $b$, as it is being rotated. On the outer side of the post $m$ the bar $k$ is provided with a pin, $q$, which serves as a stop to limit the inward movement of the presser-plate I.

It is obvious that instead of a plate, I, a lever composed of spring metal or actuated by a spring may be arranged to exert a pressure against the side of the can, and would be the full mechanical equivalent of the presser-plate I.

Instead of the flange $e$, for supporting the can while being rotated, a series of pins or projections may be arranged at suitable distances apart around the lower edge of the aperture $b$, or the bottom of the can may be supported at the center upon a rest or post properly arranged for the purpose.

What I claim as my invention, and desire to secure by Letters Patent, is—

1. In a can-soldering apparatus, the combination, with the plate C, having the solder-reservoir $f$ and feeding-channel $g$, leading therefrom to the edge of the vertical can-receiving aperture $b$, of the groove $h$, formed in the vertical wall 10 of the aperture $b$, for the reception of the upturned flange of the seam of the can to be soldered, whereby the body of the can is enabled to lie close to that portion of the vertical wall 10 of the aperture $b$ above the groove $h$ while being rotated, and the solder is caused to flow from the feeding-channel $g$ directly into the opening of the seam above the flange, substantially as described.

2. In a can-soldering apparatus, the combination, with the plate C, having the can-receiving aperture $b$ and the solder chamber or reservoir $f$, with its feeding-channel $g$, of a spring-presser device adapted to automatically force the can toward that side of the opening $b$ on which the solder-reservoir is located, whereby the can is held closely up to the feeding-channel at the edge of the opening $b$ while being rotated, substantially as set forth.

3. In a can-soldering apparatus, the combination, with the plate C, having the can-receiving aperture $b$ and the solder-chamber $f$, with its feeding-channel $g$, of the presser-plate I, mounted on the bar $k$, supported in a bearing in the post $m$, the spring $n$, and the stop-pin $q$, all operating substantially in the manner and for the purpose described.

Witness my hand this 11th day of May, A. D. 1886.

JOHN J. JOHNSTON.

In presence of—
P. E. TESCHEMACHER,
W. J. CAMBRIDGE.